(12) United States Patent
Sun

(10) Patent No.: US 10,728,949 B2
(45) Date of Patent: *Jul. 28, 2020

(54) APPARATUS, DEVICE, AND METHOD FOR ESTABLISHING CONNECTION TO PACKET DATA NETWORK

(71) Applicant: Huawei Technologies Co., Ltd., Shenzhen (CN)

(72) Inventor: Xiaoji Sun, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 88 days.

This patent is subject to a terminal disclaimer.

(21) Appl. No.: 16/007,803

(22) Filed: Jun. 13, 2018

(65) Prior Publication Data

US 2018/0295666 A1 Oct. 11, 2018

Related U.S. Application Data

(63) Continuation of application No. 15/140,887, filed on Apr. 28, 2016, now Pat. No. 10,015,834, which is a
(Continued)

(51) Int. Cl.
*H04W 76/19* (2018.01)
*H04W 36/12* (2009.01)
(Continued)

(52) U.S. Cl.
CPC .......... *H04W 76/19* (2018.02); *H04W 36/12* (2013.01); *H04W 76/22* (2018.02); *H04W 84/042* (2013.01); *H04W 88/16* (2013.01)

(58) Field of Classification Search
None
See application file for complete search history.

(56) References Cited

U.S. PATENT DOCUMENTS 10,015,834 B2 * 7/2018 Sun ..................... H04W 76/22
2007/0202871 A1 8/2007 Altshuller et al.
(Continued)

FOREIGN PATENT DOCUMENTS

CN 101616404 A 12/2009
CN 101677470 A 3/2010
(Continued)

*Primary Examiner* — Mohammad S Adhami
(74) *Attorney, Agent, or Firm* — Slater Matsil, LLP

(57) ABSTRACT

Embodiments of the present invention provide an apparatus, a device, and a method. The method comprises: when it is detected that a position of user equipment changes, determining whether an area served by an anchor gateway through which the user equipment connects to a packet data network is consistent with an area served by a data forwarding gateway; sending, to the user equipment when a result of the determining is no, a packet data network connection release request that carries a reconnection indication; receiving a packet data network reconnection request sent by the user equipment; selecting an anchor gateway that serves an area consistent with the area served by the data forwarding gateway; connecting the user equipment to the packet data network by using the selected anchor gateway. Voice service experience of a user may be improved by using the method in the present invention.

16 Claims, 7 Drawing Sheets

Related U.S. Application Data continuation of application No. PCT/CN2013/086404, filed on Nov. 1, 2013.

(51) Int. Cl.
*H04W 76/22* (2018.01)
*H04W 84/04* (2009.01)
*H04W 88/16* (2009.01)

(56) References Cited

U.S. PATENT DOCUMENTS

| | | |
|---|---|---|
| 2009/0046655 A1 | 2/2009 | Zhao et al. |
| 2010/0313024 A1 | 12/2010 | Weniger et al. |
| 2011/0026463 A1* | 2/2011 | Lair ................. H04W 76/22 370/328 |
| 2011/0096660 A1 | 4/2011 | Ikeda et al. |
| 2011/0128913 A1 | 6/2011 | Chowdhury et al. |
| 2011/0286410 A1* | 11/2011 | Zembutsu ............ H04W 36/00 370/329 |
| 2012/0069750 A1 | 3/2012 | Xing et al. |
| 2012/0082161 A1 | 4/2012 | Leung et al. |
| 2012/0113809 A1* | 5/2012 | Cortes Gomez .... H04L 12/5691 370/235 |
| 2012/0120932 A1 | 5/2012 | Liang et al. |
| 2012/0140738 A1 | 6/2012 | Zembutsu et al. |
| 2013/0028172 A1 | 1/2013 | Lim et al. |
| 2013/0097329 A1 | 4/2013 | Alex et al. |
| 2013/0272256 A1* | 10/2013 | Mihaly ............. H04L 29/12066 370/329 |
| 2014/0219188 A1 | 8/2014 | Bertin et al. |
| 2014/0348129 A1 | 11/2014 | Yang et al. |
| 2016/0007191 A1 | 1/2016 | Perras et al. |

FOREIGN PATENT DOCUMENTS

| | | |
|---|---|---|
| CN | 101730067 A | 6/2010 |
| CN | 102065503 A | 5/2011 |
| CN | 102457958 A | 5/2012 |
| CN | 102523629 A | 6/2012 |
| CN | 102868999 A | 1/2013 |
| CN | 103002429 A | 3/2013 |
| EP | 1009176 A2 | 6/2000 |
| EP | 2339785 A1 | 6/2011 |
| EP | 2475200 A2 | 7/2012 |
| JP | 2000201172 A | 7/2000 |
| JP | 2002185500 A | 6/2002 |
| JP | 2013500642 A | 1/2013 |
| JP | 2013031036 A | 2/2013 |
| JP | 2013540386 A | 10/2013 |
| WO | 2011011940 A1 | 2/2011 |
| WO | 2011034173 A1 | 3/2011 |
| WO | 2011136529 A2 | 11/2011 |
| WO | 2012041420 A1 | 4/2012 |

* cited by examiner

APPARATUS, DEVICE, AND METHOD FOR ESTABLISHING CONNECTION TO PACKET DATA NETWORK

CROSS-REFERENCE TO RELATED APPLICATIONS

This application is a continuation of U.S. patent application Ser. No. 15/140,887, filed on Apr. 28, 2016, which is a continuation of International Application No. PCT/CN2013/086404, filed on Nov. 1, 2013. All of the afore-mentioned patent applications are hereby incorporated by reference in their entireties.

TECHNICAL FIELD

The present invention relates to the field of communications technologies, and in particular, to an apparatus, a device, and a method for establishing a connection to a packet data network.

BACKGROUND

When a user equipment (UE) is performing a Voice over Internet Protocol (VOIP) service in a packet switched (PS) domain of a System Architecture Evolution (SAE)/Long Term Evolution (LTE) network, an LTE voice service based on an IP multimedia subsystem (IMS) network is referred to as a VoLTE service. The service has an independent access point name (APN), and the UE creates a corresponding packet data network (PDN) connection. A default bearer is QCI 5 and is used to bear Session Initiation Protocol (SIP) signaling. When the UE has a voice service, a policy control and charging (PCC) architecture triggers a network side to create a dedicated bearer QCI 1 to bear voice.

After a High Speed Packet Access (HSPA) network is deployed, IP voice based on an IMS network is gradually applied, and this kind of voice application is generally referred to as a VoHSPA service. The HSPA network is formed by upgrading a previous UMTS Terrestrial Radio Access Network (UTRAN). A serving general packet radio service (GPRS) support node (SGSN) on a core network side may be an S4 SGSN connected to a serving gateway (SGW), or may be a Gn/Gp SGSN connected to a gateway GPRS support node (GGSN).

As shown in FIG. 1a, when UE is attached to an LTE network, serving network elements of the LTE network separately are a mobility management entity (MME), an SGW, and a PDN gateway (PGW) that are in an area 1 (Area 1). After the UE moves from the area 1 to an area 2 (Area 2), the PGW is anchored and unchanged. That is, although the UE moves from the Area 1 to the Area 2, the PGW is still anchored in the Area 1.

Similarly, as shown in FIG. 1b, when UE is attached to an HSPA network, serving network elements of the HSPA network separately are an SGSN, an SGW, and a PGW that are in an Area 1. After the UE moves from the Area 1 to an Area 2, the PGW is anchored and unchanged. That is, although the UE moves from the Area 1 to the Area 2, the PGW is still anchored in the Area 1.

Similarly, as shown in FIG. 1c, when UE is attached to an HSPA network, serving network elements of the HSPA network separately are an SGSN and a GGSN that are in an Area 1. After the UE moves from the Area 1 to an Area 2, the GGSN is anchored and unchanged. That is, although the UE moves from the Area 1 to the Area 2, the GGSN is still anchored in the Area 1.

For example, for a VoLTE voice service, a SIP signaling stream and a voice stream are represented by the second dashed line in FIG. 1a, and there is a detour on the SIP signaling stream and the voice stream, which is the same for a VoHSPA service, thereby affecting voice service experience of a user.

On the other hand, when roaming between different public land mobile networks (PLMN), the user equipment still performs a voice service by using an anchor gateway of an original PLMN. However, generally different operators cannot interwork; therefore, the user equipment cannot smoothly perform the voice service, which also affects the voice service experience of the user.

SUMMARY

Disclosed embodiments provide an apparatus, a device, and a method for establishing a connection to a packet data network, so as to improve voice service experience of a user.

According to a first aspect, an apparatus for establishing a connection to a packet data network is provided, including: a first determining unit, configured to: when it is detected that a position of user equipment changes, determine whether an area served by an anchor gateway through which the user equipment connects to a packet data network is consistent with an area served by a data forwarding gateway; a sending unit, configured to: send, to the user equipment when a result of the determining is no, a packet data network connection release request that carries a reconnection indication; a receiving unit, configured to receive a packet data network reconnection request sent by the user equipment; a selection unit, configured to select an anchor gateway that serves an area consistent with the area served by the data forwarding gateway; and a connection unit, configured to connect the user equipment to the packet data network by using the selected anchor gateway.

In a first possible implementation manner, the first determining unit is specifically configured to determine, according to a result of comparing a host name of the anchor gateway and that of the data forwarding gateway, whether the area served by the anchor gateway is consistent with the area served by the data forwarding gateway.

With reference to the first aspect, in a second possible implementation manner, the first determining unit is specifically configured to determine, according to a local anchor gateway list, whether the anchor gateway is in the local anchor gateway list.

With reference to the first aspect, or the first possible implementation manner of the first aspect, or the second possible implementation manner of the first aspect, in a third possible implementation manner, the apparatus further includes: a second determining unit, configured to determine whether the user equipment currently has a voice service; and a detection unit, configured to: when a result of the second determining unit is yes, detect whether a current voice bearer of the user equipment is released completely; where the sending unit is specifically configured to: if the detection unit detects that the current voice bearer of the user equipment is released completely, send, to the user equipment, the packet data network connection release request that carries the reconnection indication.

With reference to the first aspect, or the first possible implementation manner of the first aspect, or the second possible implementation manner of the first aspect, or the third possible implementation manner of the first aspect, in a fourth possible implementation manner, the data forwarding gateway is a serving gateway (SGW), and the corresponding anchor gateway is a packet data network gateway (PGW); or the data forwarding gateway is a Gn/Gp SGSN, and the corresponding anchor gateway is a GGSN.

According to a second aspect, an apparatus for establishing a connection to a packet data network is provided, including: a sending unit, configured to: when it is detected that user equipment roams from a first public land mobile network (PLMN) to a second PLMN, send, to the user equipment, a packet data network connection release request that carries a reconnection indication; a receiving unit, configured to receive a packet data network reconnection request sent by the user equipment; a selection unit, configured to select an anchor gateway of the second PLMN; and a connection unit, configured to connect the user equipment to the packet data network by using the selected anchor gateway.

In a first possible implementation manner, the anchor gateway is a packet data network gateway (PGW) or a GGSN.

According to a third aspect, a device for establishing a connection to a packet data network is provided, including an input apparatus, an output apparatus, a memory, and a processor, where: the processor is configured to perform the following steps: when it is detected that a position of user equipment changes, determine whether an area served by an anchor gateway through which the user equipment connects to a packet data network is consistent with an area served by a data forwarding gateway; send, to the user equipment when a result of the determining is no, a packet data network connection release request that carries a reconnection indication; receive a packet data network reconnection request sent by the user equipment; select an anchor gateway that serves an area consistent with the area served by the data forwarding gateway; and connect the user equipment to the packet data network by using the selected anchor gateway.

In a first possible implementation manner, the step that the processor determines whether the area served by the anchor gateway through which the user equipment connects to the packet data network is consistent with the area served by the data forwarding gateway includes: determining, according to a result of comparing a host name of the anchor gateway and that of the data forwarding gateway, whether the area served by the anchor gateway is consistent with the area served by the data forwarding gateway.

With reference to the third aspect, in a second possible implementation manner, the step that the processor determines whether the area served by the anchor gateway through which the user equipment connects to the packet data network is consistent with the area served by the data forwarding gateway includes: determining, according to a local anchor gateway list, whether the anchor gateway is in the local anchor gateway list.

With reference to the third aspect, or the first possible implementation manner of the third aspect, or the second possible implementation manner of the third aspect, in a third possible implementation manner, after performing the step of determining that the area served by the anchor gateway through which the user equipment connects to the packet data network is inconsistent with the area served by the data forwarding gateway and before performing the step of sending, to the user equipment, the packet data network connection release request that carries the reconnection indication, the processor further performs the following steps: determine whether the user equipment currently has a voice service; and if a result of the determining is yes, detect whether a current voice bearer of the user equipment is released completely; and the step that the processor sends, to the user equipment when the result of the determining is no, the packet data network connection release request that carries the reconnection indication includes: if it is detected that the current voice bearer of the user equipment is released completely, sending, to the user equipment, the packet data network connection release request that carries the reconnection indication.

With reference to the third aspect, or the first possible implementation manner of the third aspect, or the second possible implementation manner of the third aspect, or the third possible implementation manner of the third aspect, in a fourth possible implementation manner, the data forwarding gateway is a serving gateway (SGW), and the corresponding anchor gateway is a packet data network gateway (PGW); or the data forwarding gateway is a Gn/Gp SGSN, and the corresponding anchor gateway is a GGSN.

According to a fourth aspect, a device for establishing a connection to a packet data network is provided, including an input apparatus, an output apparatus, a memory, and a processor, where: the processor is configured to perform the following steps: when it is detected that user equipment roams from a first public land mobile network PLMN to a second PLMN, send, to the user equipment, a packet data network connection release request that carries a reconnection indication; receive a packet data network reconnection request sent by the user equipment; select an anchor gateway of the second PLMN; and connect the user equipment to the packet data network by using the selected anchor gateway.

In a first possible implementation manner, the anchor gateway is a packet data network gateway PGW or a GGSN.

According to a fifth aspect, a method for establishing a connection to a packet data network is provided, including: when it is detected that a position of user equipment changes, determining whether an area served by an anchor gateway through which the user equipment connects to a packet data network is consistent with an area served by a data forwarding gateway; sending, to the user equipment when a result of the determining is no, a packet data network connection release request that carries a reconnection indication; receiving a packet data network reconnection request sent by the user equipment; selecting an anchor gateway that serves an area consistent with the area served by the data forwarding gateway; and connecting the user equipment to the packet data network by using the selected anchor gateway.

In a first possible implementation manner, the determining whether an area served by an anchor gateway through which the user equipment connects to a packet data network is consistent with an area served by a data forwarding gateway includes: determining, according to a result of comparing a host name of the anchor gateway and that of the data forwarding gateway, whether the area served by the anchor gateway is consistent with the area served by the data forwarding gateway.

With reference to the fifth aspect, in a second possible implementation manner, the determining whether an area served by an anchor gateway through which the user equipment connects to a packet data network is consistent with an area served by a data forwarding gateway includes: determining, according to a local anchor gateway list, whether the anchor gateway is in the local anchor gateway list.

With reference to the fifth aspect, or the first possible implementation manner of the fifth aspect, or the second possible implementation manner of the fifth aspect, in a third possible implementation manner, after the determining that the area served by the anchor gateway through which the user equipment connects to the packet data network is inconsistent with the area served by the data forwarding gateway and before the sending, to the user equipment, a packet data network connection release request that carries a reconnection indication, the method further includes: determining whether the user equipment currently has a voice service; and if a result of the determining is yes, detecting whether a current voice bearer of the user equipment is released completely; where the sending, to the user equipment when a result of the determining is no, a packet data network connection release request that carries a reconnection indication includes: if it is detected that the current voice bearer of the user equipment is released completely, sending, to the user equipment, the packet data network connection release request that carries the reconnection indication.

With reference to the fifth aspect, or the first possible implementation manner of the fifth aspect, or the second possible implementation manner of the fifth aspect, or the third possible implementation manner of the fifth aspect, in a fourth possible implementation manner, the data forwarding gateway is a serving gateway (SGW), and the corresponding anchor gateway is a packet data network gateway (PGW); or the data forwarding gateway is a Gn/Gp SGSN, and the corresponding anchor gateway is a GGSN.

According to a sixth aspect, a method for establishing a connection to a packet data network is provided, including: when it is detected that user equipment roams from a first public land mobile network (PLMN) to a second PLMN, sending, to the user equipment, a packet data network connection release request that carries a reconnection indication; receiving a packet data network reconnection request sent by the user equipment; selecting an anchor gateway of the second PLMN; and connecting the user equipment to the packet data network by using the selected anchor gateway.

In a first possible implementation manner, the anchor gateway is a packet data network gateway (PGW) or a GGSN.

Voice service experience of a user may be improved by using technical solutions of the apparatus, the device, and the method for establishing a connection to a packet data network provided in the embodiments of the present invention.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes embodiments with reference to the accompanying drawings. Apparently, the described embodiments are merely some but not all of the disclosed embodiments. All other embodiments obtained by a person of ordinary skill in the art based on the embodiments of the present invention without creative efforts shall fall within the protection scope of the present invention.

Figure 1A:
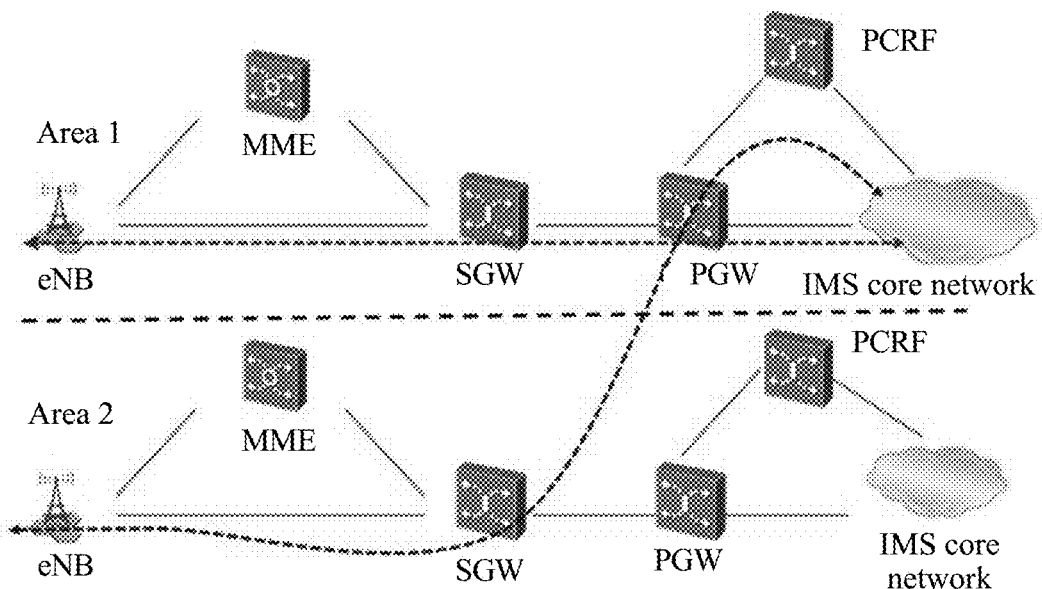
FIG. 1*a* is a schematic flowchart of an example of a VoLTE service when a position of user equipment changes.
Figure 1B:
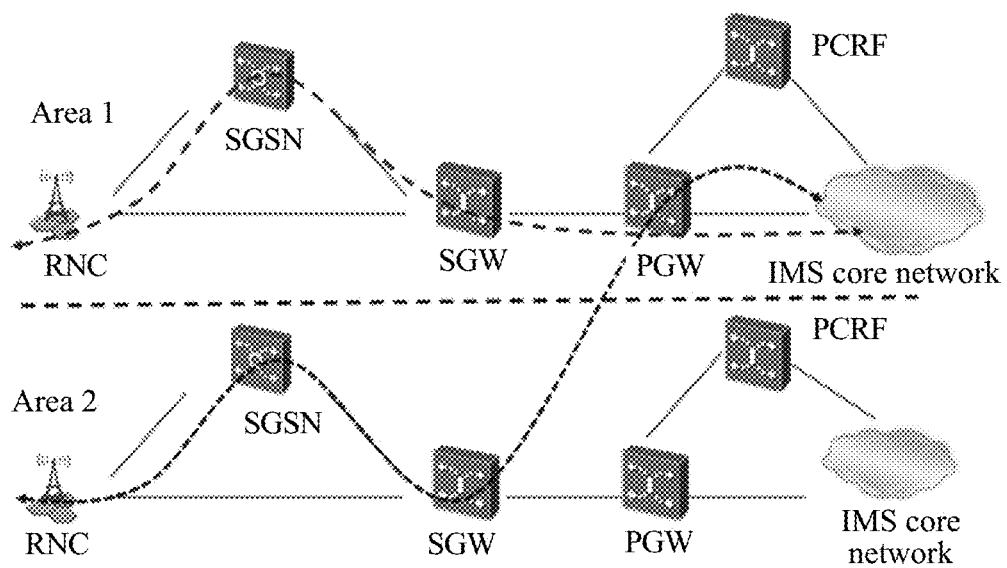
FIG. 1*b* is a schematic flowchart of an example of a VoHSPA service when a position of user equipment changes.
Figure 1C:
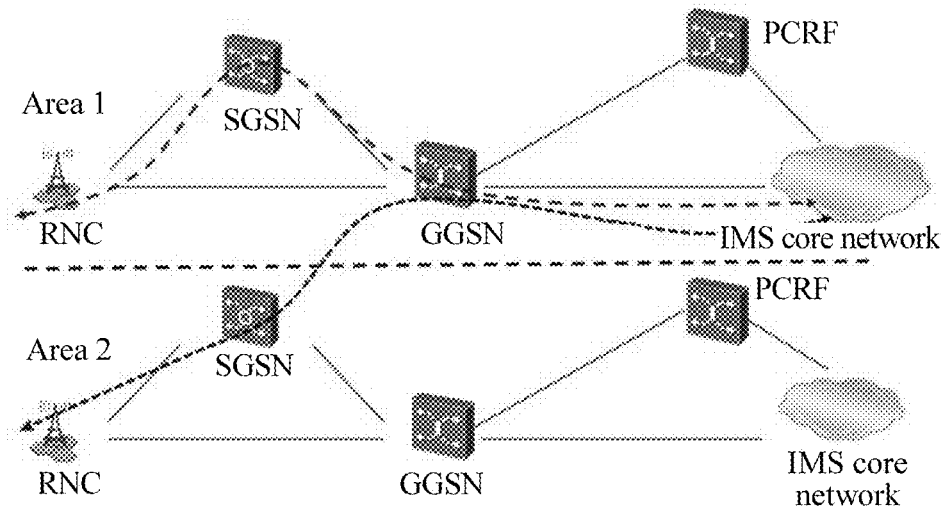
FIG. 1*c* is a schematic flowchart of another example of a VoHSPA service when a position of user equipment changes.
Figure 2:
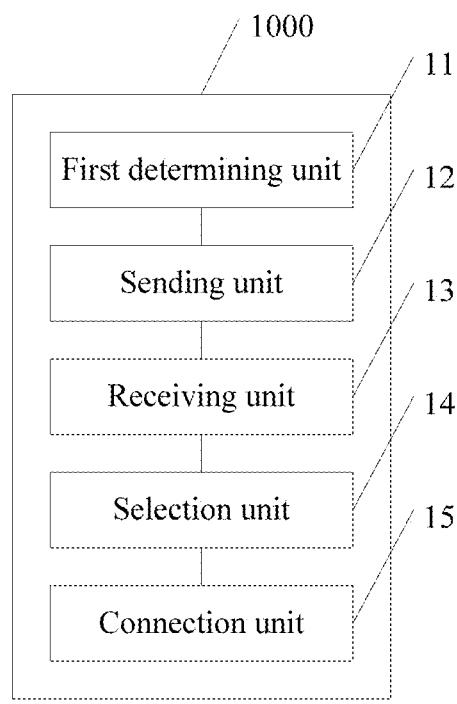
FIG. 2 is a schematic structural diagram of an embodiment of an apparatus for establishing a connection to a packet data network according to the present invention.

FIG. 2 is a schematic structural diagram of an embodiment of an apparatus for establishing a connection to a packet data network according to the present invention. As shown in FIG. 2, an apparatus 1000 includes: a first determining unit 11, a sending unit 12, a receiving unit 13, a selection unit 14, and a connection unit 15.

The first determining unit 11 is configured to: when it is detected that a position of user equipment changes, determine whether an area served by an anchor gateway through which the user equipment connects to a packet data network is consistent with an area served by a data forwarding gateway.

When the position of the user equipment changes, for example, the user equipment moves from coverage of one area to coverage of another area, the first determining unit 11 needs to determine whether the area served by the anchor gateway through which the user equipment connects to the packet data network is consistent with the area served by the data forwarding gateway. If inconsistent, when the user equipment initiates a voice service, a detour of a signaling stream and a voice stream in the prior art occurs, which affects voice service experience of a user.

Whether the area served by the anchor gateway is consistent with the area served by the data forwarding gateway may be determined by comparing whether a host name of the anchor gateway is consistent with that of the data forwarding gateway, where if consistent, the areas served by the two are consistent; or may be determined by searching an anchor gateway list stored locally. If the anchor gateway currently connected to the packet data network is not in the local anchor gateway list, it is deemed that the area served by the anchor gateway is inconsistent with the area served by the data forwarding gateway; otherwise, it is deemed that the areas served by the two are consistent.

The sending unit 12 is configured to: send, to the user equipment when a result of the determining is no, a packet data network connection release request that carries a reconnection indication.

When the result of the determining of the first determining unit 11 is that the area served by the anchor gateway through which the user equipment connects to the packet data network is inconsistent with the area served by the data forwarding gateway, the sending unit 12 needs to send the packet data network connection release request to the user equipment, where the release request carries the reconnection indication.

The receiving unit 13 is configured to receive a packet data network reconnection request sent by the user equipment.

The receiving unit 13 receives the packet data network reconnection request resent by the user equipment.

The selection unit 14 is configured to select an anchor gateway that serves an area consistent with the area served by the data forwarding gateway.

The connection unit 15 is configured to connect the user equipment to the packet data network by using the anchor gateway that serves an area consistent with the area served by the data forwarding gateway.

When the receiving unit 13 receives the packet data network reconnection request sent by the user equipment, the selection unit 14 selects the anchor gateway that serves an area consistent with the area served by the data forwarding gateway, and then, the connection unit 15 connects the user equipment to the packet data network by using the selected anchor gateway, which may avoid a detour of a signaling stream and a voice stream and improve voice service experience of a user.

According to the apparatus for establishing a connection to a packet data network provided in this embodiment of the present invention, a detour of a signaling stream and a voice stream may be avoided, and voice service experience of a user is improved.

Figure 3:
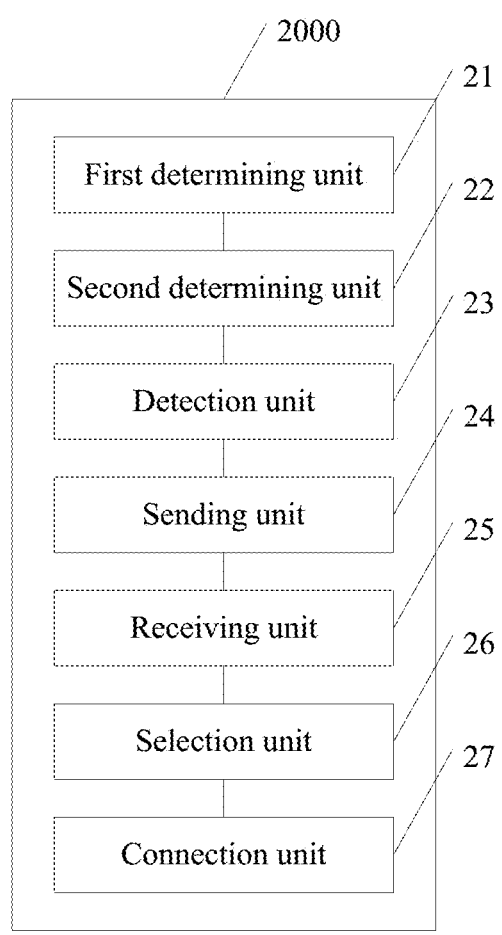
FIG. 3 is a schematic structural diagram of another embodiment of an apparatus for establishing a connection to a packet data network according to the present invention.

FIG. 3 is a schematic structural diagram of another embodiment of an apparatus for establishing a connection to a packet data network according to the present invention. As shown in FIG. 3, the apparatus 2000 includes a first determining unit 21, a second determining unit 22, a detection unit 23, a sending unit 24, a receiving unit 25, a selection unit 26, and a connection unit 27.

The first determining unit 21 is configured to: when it is detected that a position of user equipment changes, determine whether an area served by an anchor gateway through which the user equipment connects to a packet data network is consistent with an area served by a data forwarding gateway.

In this embodiment of the present invention, in a VoLTE service, the apparatus 2000 may be an MME, the corresponding data forwarding gateway may be an SGW, and the anchor gateway may be a PGW. In a VoHSPA service, the apparatus 2000 may be an S4 SGSN or a Gn/Gp SGSN; corresponding to the S4 SGSN, the data forwarding gateway may be an SGW, and the anchor gateway may be a PGW; corresponding to the Gn/Gp SGSN, the data forwarding gateway may be a Gn/Gp SGSN, and the anchor gateway may be a GGSN.

For example, UE is attached to an LTE network in an Area 1 and establishes a connection to a packet data network such as an IMS Core, and an anchor gateway through which the connection passes is a PGW in the Area 1. Now the UE moves from the Area 1 to an Area 2, an MME selects an SGW according to a tracking area which the UE actually accesses, and the MME compares a host name of the current SGW of the UE with a host name of the current PGW. If the host names are consistent, areas served by the SGW and the PGW are the same, and the MME does not need to perform a reselection operation on the PGW of the UE. For example, the host name of the SGW is: topon.s5.gw32.california.west.example.com, and the host name of the PGW is: topon.s5.gw31.california.west.example.com; therefore, the two gateways belong to a same area california.west.example.com.

The MME may determine, according to a local PGW list configured in the MME in addition to the areas in which the above host names are located, whether the SGW and the PGW belong to a same area. That is, it is deemed that all PGWs not in a range of the PGW list configured locally are not PGWs in a current area.

The second determining unit 22 is configured to determine whether the user equipment currently has a voice service.

The detection unit 23 is configured to: when a result of the second determining unit is yes, detect whether a current voice bearer of the user equipment is released completely.

The sending unit 24 is configured to: if the detection unit detects that the current voice bearer of the user equipment is released completely, send, to the user equipment, a packet data network connection release request that carries a reconnection indication.

According to the above example, if the areas in which the SGW and the PGW are located are different, the MME determines whether the UE currently has a voice service (that is, whether the MME has a QCI 1 bearer of a voice PDN connection). If the UE has a corresponding VoLTE voice service, after a voice service bearer of the UE is released completely, the MME initiates a voice PDN connection release, where the release request carries a reconnection indication. If the UE does not have a corresponding VoLTE voice service, the MME directly initiates a voice PDN connection release and triggers the UE to reestablish the voice PDN connection.

The receiving unit 25 is configured to receive a packet data network reconnection request sent by the user equipment.

According to the above example, after receiving a voice PDN connection release request sent by the MME, the UE initiates a reconnection request of the voice PDN connection.

The selection unit 26 is configured to select an anchor gateway that serves an area consistent with the area served by the data forwarding gateway.

The connection unit 27 is configured to connect the user equipment to the packet data network by using the selected anchor gateway.

According to the above example, after receiving the reconnection request of the voice PDN connection of the UE, the MME selects a PGW that is in a same area as the current SGW to serve the UE.

For a VoHSPA service controlled by the S4 SGSN, a procedure of the service is as follows:

1. UE is attached to an LTE network in an Area 1 and creates a voice Packet Data Protocol (PDP) connection, and an anchor gateway of the voice PDP connection is a PGW in the Area 1.

2. The UE moves from the Area 1 to an Area 2, an SGSN selects an SGW according to a tracking area which the UE actually accesses, and the SGSN compares a host name of the current SGW of the UE with a host name of the current PGW. If areas are the same, the SGSN does not need to perform a reselection operation on the PGW of the UE. For example, the host name of the SGW is: topon.s5.gw32.california.west.example.com, and the host name of the PGW is: topon.s5.gw31.california.west.example.com; therefore, the two gateways belong to a same area california.west.example.com.

3. If areas in which the SGW and the PGW are located are different, the SGSN determines whether the UE currently has a voice service (that is, whether the SGSN has a secondary PDP corresponding to the voice service). If the UE has a corresponding VoHSPA voice service, after a voice service PDP of the UE is released completely, the SGSN initiates a voice PDP release, where the release request carries a reconnection indication. After receiving a voice PDP release request sent by the SGSN, the UE initiates a voice PDP reconnection request. If the UE does not have a corresponding VoHSPA voice service, the SGSN directly initiates a voice PDP connection release and triggers the UE to re-initiate the voice PDP connection.

The SGSN may determine, according to a local PGW list configured in the SGSN in addition to the areas in which the above host names are located, whether the SGW and the PGW belong to a same area. That is, it is deemed that all PGWs not in a range of the PGW list configured locally are not PGWs in a current area.

4. After receiving the reconnection request of the voice PDP connection of the UE, the SGSN selects a PGW that is in a same area as the current SGW to serve the UE.

For a VoHSPA service controlled by the Gn/Gp SGSN, a procedure of the service is as follows:

After UE moves from coverage of an Area 1 to coverage of an Area 2, the Gn/Gp SGSN determines whether a currently selected SGSN and GGSN belong to a same area. In a case in which the SGSN and the GGSN are not in the same area, and the UE currently does not have a VoHSPA voice service, the SGSN initiates voice PDP deletion of the UE and triggers the UE to reestablish a voice PDP. In a process of reestablishing the voice PDP, the SGSN selects a GGSN that is in a same area as the SGSN to serve the UE. After the foregoing processing is completed, the UE registers with a GGSN of the Area 2 after moving to the Area 2, and the UE is served by the GGSN of the Area 2.

A difference from the S4 SGSN scenario is as follows: The Gn/Gp SGSN cannot determine whether an SGSN and a GGSN belong to a same area by using host names, and can determine, only by using a local GGSN list configured in the Gn/Gp SGSN, whether the GGSN is in the local list.

According to the apparatus for establishing a connection to a packet data network provided in this embodiment of the present invention, an area served by an anchor gateway is made to be consistent with an area served by a data forwarding gateway, so that a detour of a signaling stream and a voice stream can be avoided, which improves voice service experience of a user; voice service traffic localization can be ensured, so that a voice service call delay is reduced, and a success rate of voice service establishment is increased.

Figure 4:
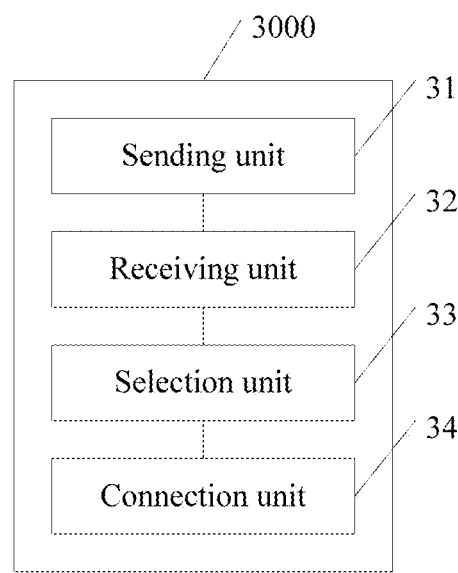
FIG. 4 is a schematic structural diagram of still another embodiment of an apparatus for establishing a connection to a packet data network according to the present invention.

FIG. 4 is a schematic structural diagram of still another embodiment of an apparatus for establishing a connection to a packet data network according to the present invention. As shown in FIG. 4, the apparatus 3000 includes:

a sending unit 31, configured to: when it is detected that user equipment roams from a first public land mobile network PLMN to a second PLMN, send, to the user equipment, a packet data network connection release request that carries a reconnection indication;

a receiving unit 32, configured to receive a packet data network reconnection request sent by the user equipment;

a selection unit 33, configured to select an anchor gateway of the second PLMN; and a connection unit 34, configured to connect the user equipment to the packet data network by using the selected anchor gateway.

When the user equipment moves between different operators, that is, roams from one PLMN to another PLMN, the sending unit 31 needs to send a packet data network connection release request to the user equipment, where the request carries a reconnection indication. Otherwise, after moving, the user equipment may be incapable of connecting to a packet data network by using an original anchor gateway, which affects a VoLTE or VoHSPA voice service of the user equipment. After receiving the packet data network connection release request, the user equipment sends a packet data network reconnection request to the receiving unit 32. After the receiving unit 32 receives the packet data network reconnection request sent by the user equipment, the selection unit 33 selects an anchor gateway of the PLMN to which the user equipment roams, and the connection unit 34 connects the user equipment to the packet data network by using the selected anchor gateway, so that the user equipment can successfully perform its VoLTE or VoHSPA voice service.

A VoLTE voice service controlled by an MME is used as an example. After UE roams from coverage of one PLMN to coverage of another PLMN, an MME with which the UE currently registers determines whether the UE that gains access in a roaming area has an IMS PDN connection resource. If there is the IMS PDN connection resource, and a current PLMN supports a VoLTE service of a roaming user, the MME instructs the UE to reestablish the IMS PDN connection by using a message for initiating an IMS PDN connection deletion request. In a process of reestablishing the IMS PDN connection by the UE, the MME selects, for the roaming user, a local PGW to serve the UE. Specific operations are as follows:

1. UE is attached to a PLMN1 network and creates a voice PDN connection, and an anchor gateway of the voice PDN connection is a PGW of the PLMN1.

2. The UE roams from the PLMN1 to a PLMN2, and an MME selects, for the UE, an SGW2 of the local PLMN.

3. After the UE roams to a new PLMN, the MME determines that the UE roams from the PLMN1 to the PLMN2 network. If the UE currently has an IMS PDN connection, and the PLMN2 supports a VoLTE service of a roaming user, the MME releases the IMS PDN connection of the UE and instructs the UE to recreate an IMS PDN connection.

4. After receiving a voice PDN connection establishment request of the UE, the MME selects a PGW of the current PLMN.

A VoLTE voice service controlled by an SGSN is used as another example. After UE roams from coverage of one PLMN to coverage of another PLMN, an SGSN with which the UE currently registers determines whether the UE that gains access in a roaming area has an IMS PDP resource. If there exists the IMS PDP connection resource, and the current PLMN network supports a VoLTE service of a roaming user, the SGSN instructs the UE to reestablish the IMS PDP connection by using a message for initiating an IMS PDP deletion request. In a process of reestablishing the IMS PDP connection by the UE, the SGSN selects, for the roaming user, a local GGSN to serve the UE.

According to the apparatus for establishing a connection to a packet data network provided in this embodiment of the present invention, when roaming between different public land mobile networks, user equipment can successfully perform a voice service, which improves voice service experience of a user.

Figure 5:
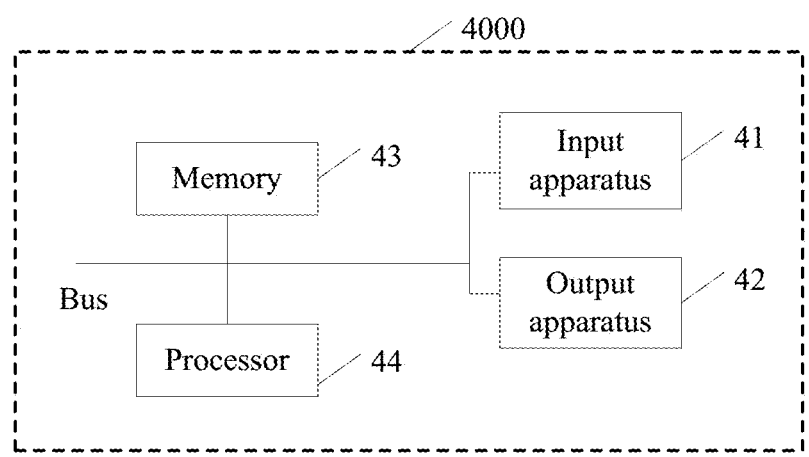
FIG. 5 is a schematic structural diagram of an embodiment of a device for establishing a connection to a packet data network according to the present invention.

FIG. 5 is a schematic structural diagram of an embodiment of a device for establishing a connection to a packet data network according to the present invention. As shown in FIG. 5, the device 4000 includes:

an input apparatus 41, an output apparatus 42, a memory 43, and a processor 44 (a quantity of processors 44 in a monitoring device may be one or more, and one processor is used as an example in FIG. 5). In some embodiments of the present invention, the input apparatus 41, the output apparatus 42, the memory 443, and the processor 44 may be connected to each other by using a bus or in another manner. That they are connected to each other by using a bus is used as an example in FIG. 5.

The memory 33 stores a group of program code, and the processor 44 is configured to invoke the program code stored in the memory 33, so as to perform the following operations:

when it is detected that a position of user equipment changes, determine whether an area served by an anchor gateway through which the user equipment connects to a packet data network is consistent with an area served by a data forwarding gateway;

send, to the user equipment when a result of the determining is no, a packet data network connection release request that carries a reconnection indication;

receive a packet data network reconnection request sent by the user equipment;

select an anchor gateway of the second PLMN; and connect the user equipment to the packet data network by using the selected anchor gateway.

In some embodiments of the present invention, the step that the processor 44 determines whether the area served by the anchor gateway through which the user equipment connects to the packet data network is consistent with the area served by the data forwarding gateway includes:

determining, according to a result of comparing a host name of the anchor gateway and that of the data forwarding gateway, whether the area served by the anchor gateway is consistent with the area served by the data forwarding gateway.

In some embodiments of the present invention, the step that the processor 44 determines whether the area served by the anchor gateway through which the user equipment connects to the packet data network is consistent with the area served by the data forwarding gateway includes:

determining, according to a local anchor gateway list, whether the anchor gateway is in the local anchor gateway list.

In some embodiments of the present invention, after performing the step of determining that the area served by the anchor gateway through which the user equipment connects to the packet data network is inconsistent with the area served by the data forwarding gateway and before performing the step of sending, to the user equipment, the packet data network connection release request that carries the reconnection indication, the processor 44 further performs the following steps:

determine whether the user equipment currently has a voice service; and if a result of the determining is yes, detect whether a current voice bearer of the user equipment is released completely.

The step that the processor sends, to the user equipment when the result of the determining is no, the packet data network connection release request that carries the reconnection indication includes:

if it is detected that the current voice bearer of the user equipment is released completely, sending, to the user equipment, the packet data network connection release request that carries the reconnection indication.

In some embodiments of the present invention, the data forwarding gateway is a serving gateway SGW, and the corresponding anchor gateway is a packet data network gateway PGW; or the data forwarding gateway is a Gn/Gp SGSN, and the corresponding anchor gateway is a GGSN.

According to the device for establishing a connection to a packet data network provided in this embodiment of the present invention, a detour of a signaling stream and a voice stream may be avoided, and voice service experience of a user is improved.

Figure 6:
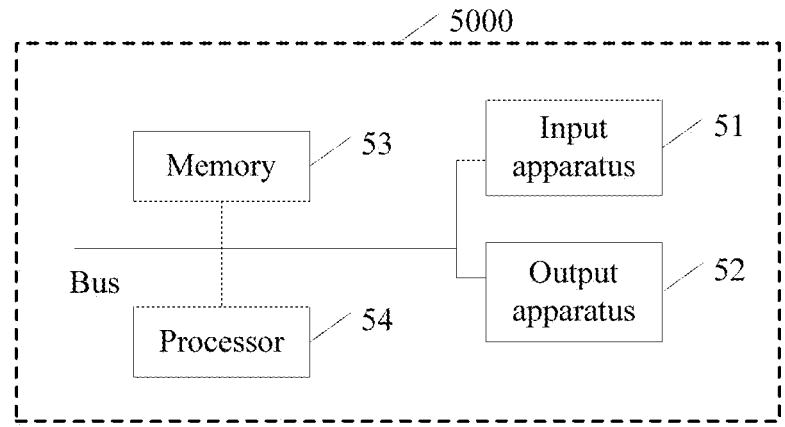
FIG. 6 is a schematic structural diagram of another embodiment of a device for establishing a connection to a packet data network according to the present invention.

FIG. 6 is a schematic structural diagram of another embodiment of a device for establishing a connection to a packet data network according to the present invention. As shown in FIG. 6, the device 5000 includes:

an input apparatus 51, an output apparatus 52, a memory 53, and a processor 54 (a quantity of processors 54 in a monitoring device may be one or more, and one processor is used as an example in FIG. 6). In some embodiments of the present invention, the input apparatus 51, the output apparatus 52, the memory 53, and the processor 54 may be connected to each other by using a bus or in another manner. That they are connected to each other by using a bus is used as an example in FIG. 6.

The memory 53 stores a group of program code, and the processor 54 is configured to invoke the program code stored in the memory 53, so as to perform the following operations:

when it is detected that user equipment roams from a first public land mobile network PLMN to a second PLMN, send, to the user equipment, a packet data network connection release request that carries a reconnection indication;

receive a packet data network reconnection request sent by the user equipment;

select an anchor gateway of the second PLMN; and connect the user equipment to the packet data network by using the selected anchor gateway.

In some feasible implementation manners, the anchor gateway is a packet data network gateway PGW or a GGSN.

According to the device for establishing a connection to a packet data network provided in this embodiment of the present invention, when roaming between different public land mobile networks, user equipment can successfully perform a voice service, which improves voice service experience of a user.

Figure 7:
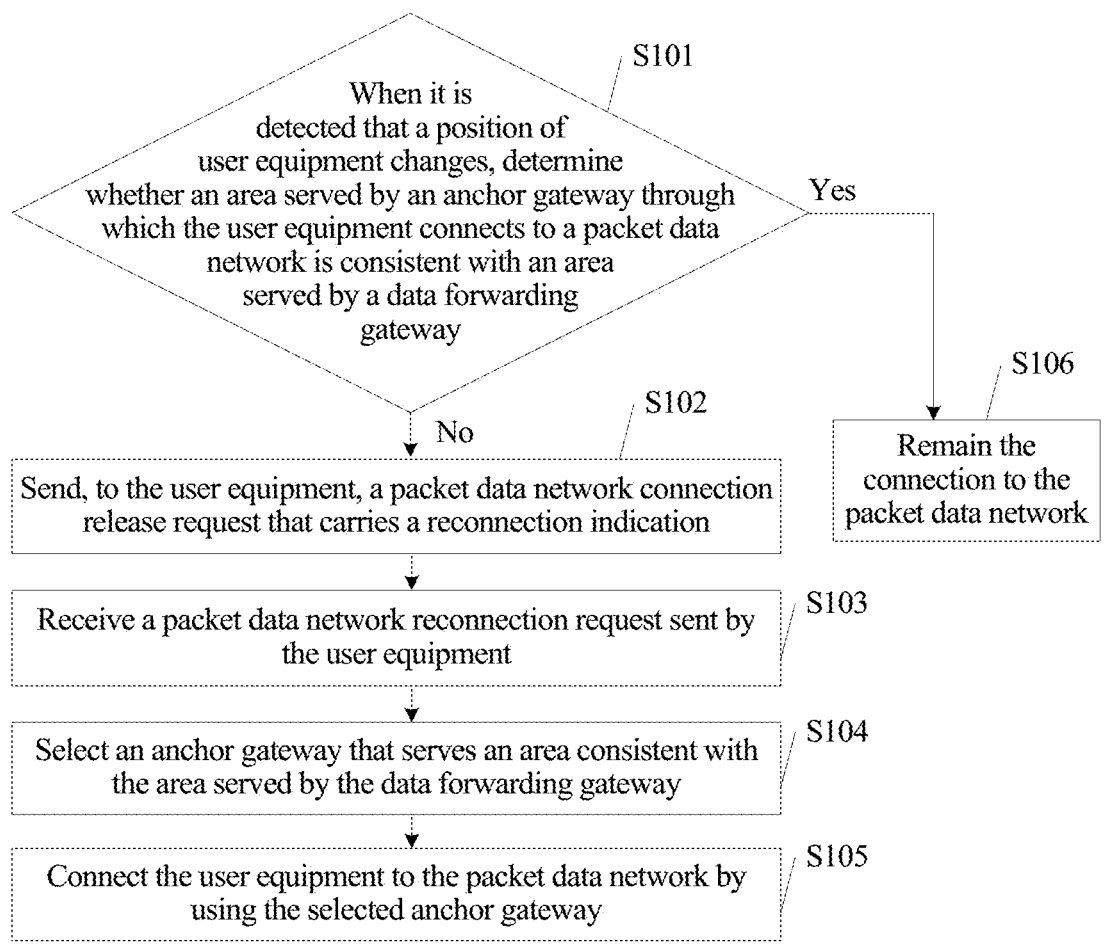
FIG. 7 is a flowchart of an embodiment of a method for establishing a connection to a packet data network according to the present invention.

FIG. 7 is a flowchart of an embodiment of a method for establishing a connection to a packet data network according to the present invention. As shown in FIG. 7, the method includes the following steps:

Step S101: When it is detected that a position of user equipment changes, determine whether an area served by an anchor gateway through which the user equipment connects to a packet data network is consistent with an area served by a data forwarding gateway, where if yes, go to step S106; otherwise, go to step S102.

When the position of the user equipment changes, for example, the user equipment moves from coverage of one area to coverage of another area, it is determined whether the area served by the anchor gateway through which the user equipment connects to the packet data network is consistent with the area served by the data forwarding gateway. If inconsistent, when the user equipment initiates a voice service, a detour of a signaling stream and a voice stream in the prior art occurs, which affects voice service experience of a user. If consistent, the connection to the packet data network remains.

Whether the area served by the anchor gateway is consistent with the area served by the data forwarding gateway may be determined by comparing whether a host name of the anchor gateway is consistent with that of the data forwarding gateway, where if consistent, the areas served by the two are consistent; or may be determined by searching an anchor gateway list stored locally. If the anchor gateway currently connected to the packet data network is not in the local anchor gateway list, it is deemed that the area served by the anchor gateway is inconsistent with the area served by the data forwarding gateway; otherwise, it is deemed that the areas served by the two are consistent.

Step S102: Send, to the user equipment, a packet data network connection release request that carries a reconnection indication.

When a result of the determining is that the area served by the anchor gateway through which the user equipment connects to the packet data network is inconsistent with the area served by the data forwarding gateway, the packet data network connection release request is sent to the user equipment, and the release request carries the reconnection indication.

Step S103: Receive a packet data network reconnection request sent by the user equipment.

The packet data network reconnection request resent by the user equipment is received.

Step S104: Select an anchor gateway that serves an area consistent with the area served by the data forwarding gateway.

Step S105: Connect the user equipment to the packet data network by using the selected anchor gateway.

Step S106: Remain the connection to the packet data network.

When the packet data network reconnection request sent by the user equipment is received, an anchor gateway that serves an area consistent with the area served by the data forwarding gateway is selected, so as to connect the user equipment to the packet data network, which may avoid a detour of a signaling stream and a voice stream and improve voice service experience of a user.

According to the method for establishing a connection to a packet data network provided in this embodiment of the present invention, a detour of a signaling stream and a voice stream may be avoided, and voice service experience of a user is improved.

Figure 8:
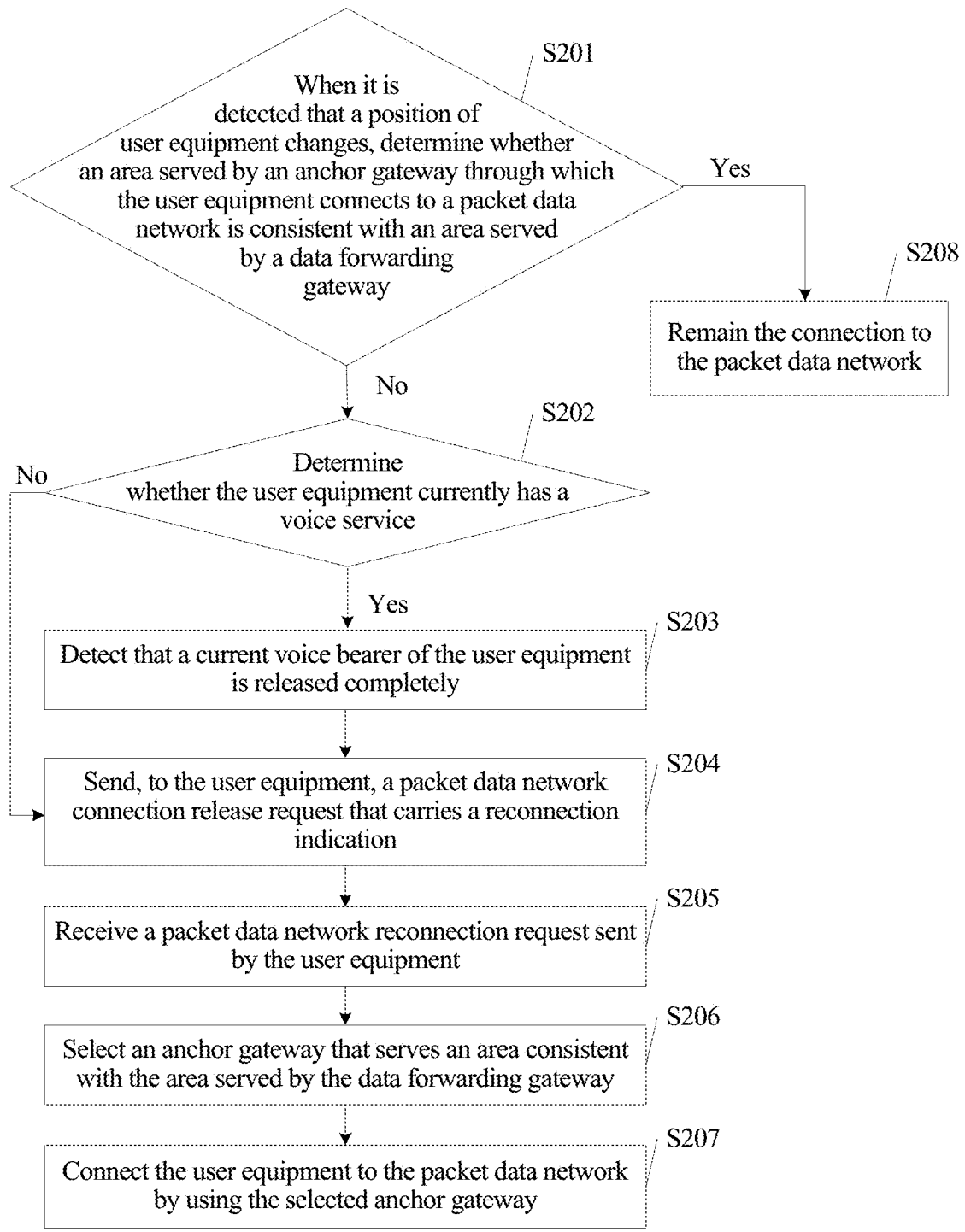
FIG. 8 is a flowchart of another embodiment of a method for establishing a connection to a packet data network according to the present invention.

FIG. 8 is a flowchart of another embodiment of a method for establishing a connection to a packet data network according to the present invention. As shown in FIG. 8, the method includes the following steps:

Step S201: When it is detected that a position of user equipment changes, determine whether an area served by an anchor gateway through which the user equipment connects to a packet data network is consistent with an area served by a data forwarding gateway, where if yes, go to step S208; otherwise, go to step S202.

In this embodiment of the present invention, in a VoLTE service, an apparatus 2000 may be an MME, the corresponding data forwarding gateway may be an SGW, and the anchor gateway may be a PGW. In a VoHSPA service, the apparatus 2000 may be an S4 SGSN or a Gn/Gp SGSN; corresponding to the S4 SGSN, the data forwarding gateway may be an SGW, and the anchor gateway may be a PGW; corresponding to the Gn/Gp SGSN, the data forwarding gateway may be a Gn/Gp SGSN, and the anchor gateway may be a GGSN.

For example, UE is attached to an LTE network in an Area 1 and establishes a connection to a packet data network such as an IMS Core, and an anchor gateway through which the connection passes is a PGW in the Area 1. Now the UE moves from the Area 1 to an Area 2, an MME selects an SGW according to a tracking area which the UE actually accesses, and the MME compares a host name of the current SGW of the UE with a host name of the current PGW. If the host names are consistent, areas served by the SGW and the PGW are the same, and the MME does not need to perform a reselection operation on the PGW of the UE. For example, the host name of the SGW is: topon.s5.gw32.california.west.example.com, and the host name of the PGW is: topon.s5.gw31.california.west.example.com; therefore, the two gateways belong to a same area california.west.example.com.

The MME may determine, according to a local PGW list configured in the MME in addition to the areas in which the above host names are located, whether the SGW and the PGW belong to a same area. That is, it is deemed that all PGWs not in a range of the PGW list configured locally are not PGWs in a current area.

Step S202: Determine whether the user equipment currently has a voice service, where if yes, go to step S203; otherwise, go to step S204.

Step S203: Detect that a current voice bearer of the user equipment is released completely.

Step S204: Send, to the user equipment, a packet data network connection release request that carries a reconnection indication.

According to the above example, if the areas in which the SGW and the PGW are located are different, the MME determines whether the UE currently has a voice service (that is, whether the MME has a QCI 1 bearer of a voice PDN connection). If the UE has a corresponding VoLTE voice service, after a voice service bearer of the UE is released completely, the MME initiates a voice PDN connection release, where the release request carries a reconnection indication. If the UE does not have a corresponding VoLTE voice service, the MME directly initiates a voice PDN connection release and triggers the UE to reestablish the voice PDN connection.

Step S205: Receive a packet data network reconnection request sent by the user equipment.

According to the above example, after receiving a voice PDN connection release request sent by the MME, the UE initiates a reconnection request of the voice PDN connection.

Step S206: Select an anchor gateway that serves an area consistent with the area served by the data forwarding gateway.

Step S207: Connect the user equipment to the packet data network by using the selected anchor gateway.

Step S208: Remain the connection to the packet data network.

According to the above example, after receiving the reconnection request of the voice PDN connection of the UE, the MME selects a PGW that is in a same area as the current SGW to serve the UE.

For a VoHSPA service controlled by the S4 SGSN, a procedure of the service is as follows:

1. UE is attached to an LTE network in an Area 1 and creates a voice Packet Data Protocol (Packet Data Protocol, PDP) connection, and an anchor gateway of the voice PDP connection is a PGW in the Area 1.

2. The UE moves from the Area 1 to an Area 2, an SGSN selects an SGW according to a tracking area which the UE actually accesses, and the SGSN compares a host name of the current SGW of the UE with a host name of the current PGW. If areas are the same, the SGSN does not need to perform a reselection operation on the PGW of the UE. For example, the host name of the SGW is: topon.s5.gw32.california.west.example.com, and the host name of the PGW is: topon.s5.gw31.california.west.example.com; therefore, the two gateways belong to a same area california.west.example.com.

3. If areas in which the SGW and the PGW are located are different, the SGSN determines whether the UE currently has a voice service (that is, whether the SGSN has a secondary PDP corresponding to the voice service). If the UE has a corresponding VoHSPA voice service, after a voice service PDP of the UE is released completely, the SGSN initiates a voice PDP release, where the release request carries a reconnection indication. After receiving a voice PDP release request sent by the SGSN, the UE initiates a voice PDP reconnection request. If the UE does not have a corresponding VoHSPA voice service, the SGSN directly initiates a voice PDP connection release and triggers the UE to re-initiate the voice PDP connection.

The SGSN may determine, according to a local PGW list configured in the SGSN in addition to the areas in which the above host names are located, whether the SGW and the PGW belong to a same area. That is, it is deemed that all PGWs not in a range of the PGW list configured locally are not PGWs in a current area.

4. After receiving the reconnection request of the voice PDP connection of the UE, the SGSN selects a PGW that is in a same area as the current SGW to serve the UE.

For a VoHSPA service controlled by the Gn/Gp SGSN, a procedure of the service is as follows:

After UE moves from coverage of an Area 1 to coverage of an Area 2, the Gn/Gp SGSN determines whether currently selected SGSN and GGSN belong to a same area. In a case in which the SGSN and the GGSN are not in the same area, and the UE currently does not have a VoHSPA voice service, the SGSN initiates voice PDP deletion of the UE and triggers the UE to reestablish a voice PDP. In a process of reestablishing the voice PDP, the SGSN selects a GGSN that is in a same area as the SGSN to serve the UE. After the foregoing processing is completed, the UE registers with a GGSN of the Area 2 after moving to the Area 2, and the UE is served by the GGSN of the Area 2.

A difference from the S4 SGSN scenario is as follows: The Gn/Gp SGSN cannot determine whether an SGSN and a GGSN belong to a same area by using host names, and can determine, only by using a local GGSN list configured in the Gn/Gp SGSN, whether the GGSN is in the local list.

According to the method for establishing a connection to a packet data network provided in this embodiment of the present invention, an area served by an anchor gateway is made consistent with an area served by a data forwarding gateway, so that a detour of a signaling stream and a voice stream can be avoided, which improves voice service experience of a user; voice service traffic localization can be ensured, so that a voice service call delay is reduced, and a success rate of voice service establishment is increased.

Figure 9:
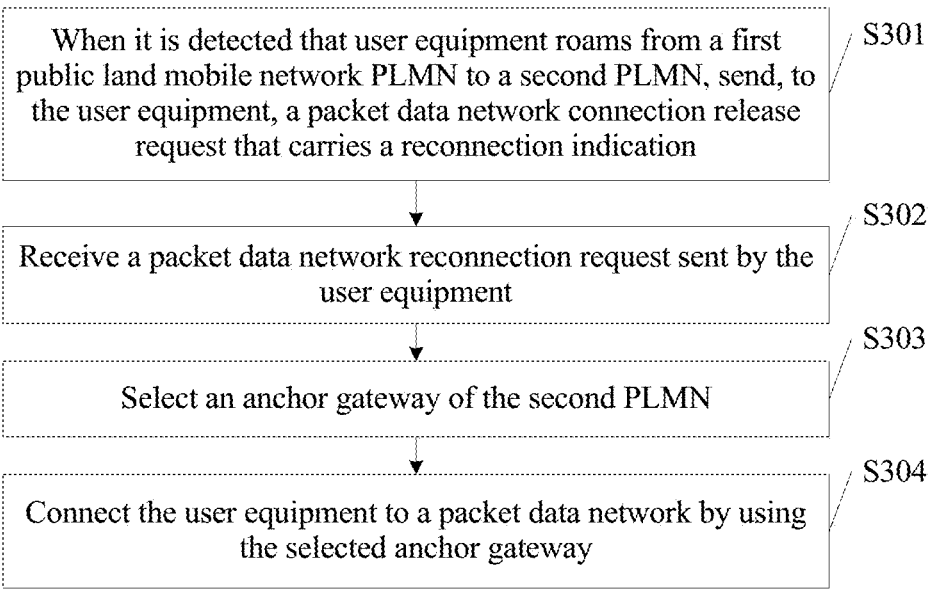
FIG. 9 is a flowchart of still another embodiment of a method for establishing a connection to a packet data network according to the present invention.

FIG. 9 is a flowchart of still another embodiment of a method for establishing a connection to a packet data network according to the present invention. As shown in FIG. 9, the method includes the following steps:

Step S301: When it is detected that user equipment roams from a first public land mobile network PLMN to a second PLMN, send, to the user equipment, a packet data network connection release request that carries a reconnection indication.

Step S302: Receive a packet data network reconnection request sent by the user equipment.

Step S303: Select an anchor gateway of the second PLMN.

Step S304: Connect the user equipment to the packet data network by using the selected anchor gateway.

Different PLMNs are managed by different operators. When user equipment moves between different operators, that is, roams from one PLMN to another PLMN, a packet data network connection release request needs to be sent to the user equipment, and the request carries a reconnection indication. Otherwise, after moving, the user equipment may be incapable of connecting to a packet data network by using an original anchor gateway, which affects a VoLTE or VoHSPA voice service of the user equipment. After receiving the packet data network connection release request, the user equipment sends a packet data network reconnection request. After the packet data network reconnection request sent by the user equipment is received, the user equipment is connected to the packet data network by using an anchor gateway of the PLMN to which the user equipment roams, so that the user equipment can successfully perform its VoLTE or VoHSPA voice service.

A VoLTE voice service controlled by an MME is used as an example. After UE roams from coverage of one PLMN to coverage of another PLMN, an MME with which the UE currently registers determines whether the UE that gains access in a roaming area has an IMS PDN connection resource. If there exists the IMS PDN connection resource, and a current PLMN supports a VoLTE service of a roaming user, the MME instructs the UE to reestablish the IMS PDN connection by using a message for initiating an IMS PDN connection deletion request. In a process of reestablishing the IMS PDN connection by the UE, the MME selects, for the roaming user, a local PGW to serve the UE. Specific operations are as follows:

1. UE is attached to a PLMN network and creates a voice PDN connection, and an anchor gateway of the voice PDN connection is a PGW of the PLMN1.

2. The UE roams from the PLMN1 to a PLMN2, and an MME selects, for the UE, an SGW2 of the local PLMN.

3. After the UE roams to a new PLMN, the MME determines that the UE roams from the PLMN1 to the PLMN2 network. If the UE currently has an IMS PDN connection, and the PLMN2 supports a VoLTE service of a roaming user, the MME releases the IMS PDN connection of the UE and instructs the UE to recreate an IMS PDN connection.

4. After receiving a voice PDN connection establishment request of the UE, the MME selects a PGW of the current PLMN.

A VoLTE voice service controlled by an SGSN is used as another example. After UE roams from coverage of one PLMN to coverage of another PLMN, an SGSN with which the UE currently registers determines whether the UE that gains access in a roaming area has an IMS PDP resource. If there exists the IMS PDP connection resource, and the current PLMN network supports a VoLTE service of a roaming user, the SGSN instructs the UE to reestablish the IMS PDP connection by using a message for initiating an IMS PDP deletion request. In a process of reestablishing the IMS PDP connection by the UE, the SGSN selects, for the roaming user, a local GGSN to serve the UE.

According to the method for establishing a connection to a packet data network provided in this embodiment of the present invention, when roaming between different public land mobile networks, user equipment can successfully perform a voice service, which improves voice service experience of a user.

In the several embodiments provided in this application, it should be understood that the disclosed device and method may be implemented in other manners. For example, the described apparatus embodiment is merely exemplary. For example, the module division is merely logical function division and may be other division in actual implementation. For example, a plurality of modules or components may be combined or integrated into another device, or some features may be ignored or not performed. In addition, the displayed or discussed mutual couplings or direct couplings or communication connections may be implemented by using some communication interfaces. The indirect couplings or communication connections between the apparatuses or modules may be implemented in electronic, mechanical, or other forms.

The modules described as separate parts may or may not be physically separate, and parts displayed as modules may or may not be physical units, may be located in one position, or may be distributed on a plurality of network units. A part or all of the modules may be selected according to actual needs to achieve the objectives of the solutions of the embodiments.

In addition, functional modules in the embodiments of the present invention may be integrated into one processing module, or each of the modules may exist alone physically, or two or more modules are integrated into one module.

Based on the foregoing descriptions of the embodiments, a person skilled in the art may clearly understand that each implementation manner may be implemented by software in addition to a necessary general hardware platform or by hardware. Based on such an understanding, the foregoing technical solutions essentially or the part contributing to the prior art may be implemented in a form of a software device. The computer software device is stored in a computer-readable storage medium, such as a ROM/RAM, a magnetic disk, or an optical disc, and includes several instructions for instructing a computer device (which may be a personal computer, a server, a network device, or the like) to perform the methods described in the embodiments or some parts of the embodiments.

The foregoing implementation manners are not intended to limit the protection scope of the technical solutions. Any modification, equivalent replacement, and improvement made without departing from the spirit and principle of the foregoing implementation manners shall fall within the protection scope of the technical solutions.

What is claimed is:

1. A device, comprising:
   a processor; and a non-transitory computer-readable storage medium storing a program to be executed by the processor;
   wherein the program comprises instructions to determine whether an area served by a data forwarding gateway is inconsistent with an area served by a first anchor gateway through which a terminal connects to a packet data network (PDN); and
   wherein, in response to determining that the area served by the data forwarding gateway is inconsistent with the area served by the first anchor gateway, the program further comprises instructions to:
   determine whether the terminal currently has a voice service;
   detect, in response to determining that the terminal currently has the voice service, whether a current voice bearer of the terminal is released completely;
   send, to the terminal in response to the detecting that the current voice bearer of the terminal is released completely, a PDN connection release request that carries a reconnection indication;
   receive a PDN reconnection request for the terminal;
   select a second anchor gateway that serves an area consistent with the area served by the data forwarding gateway; and
   connect the terminal to the PDN through the second anchor gateway.

2. The device according to claim 1, wherein the instruction to determine whether that the area served by the data forwarding gateway is inconsistent with the area served by the first anchor gateway comprises an instruction to compare a host name of the first anchor gateway with a host name of the data forwarding gateway.

3. The device according to claim 1, wherein the instruction to determine whether the area served by the data forwarding gateway is inconsistent with the area served by the first anchor gateway comprises an instruction to determine, according to a local anchor gateway list, whether the first anchor gateway is in the local anchor gateway list.

4. The device according to claim 1,
   wherein the PDN connection release request comprises a voice PDN connection release request.

5. The device according to claim 1, wherein the data forwarding gateway is a serving gateway (SGW); and
   wherein the first anchor gateway or the second anchor gateway is a PDN gateway (PGW).

6. A device, comprising:
   a processor; and
   a non-transitory computer-readable storage medium storing a program to be executed by the processor, the program comprising instructions to detect whether the terminal has roamed from a first public land mobile network (PLMN) to a second PLMN and detect whether a current voice bearer of the terminal is released completely, wherein in response to detecting that the terminal has roamed from the first public land mobile network (PLMN) to the second PLMN and detecting that the current voice bearer of the terminal is released completely, the program including instructions to:
   send, to a terminal that currently has a voice service, a voice packet data network (PDN) connection release request that carries a reconnection indication;
   receive a PDN reconnection request for the terminal;
   select an anchor gateway of the second PLMN; and
   connect the terminal to the PDN through the anchor gateway that is selected.

7. The device according to claim 6, wherein the anchor gateway is a PDN gateway (PGW) or a gateway general packet radio service (GPRS) support node (GGSN).

8. A method, comprising:
   determining, in response to detecting a change in a position of a terminal that currently has a voice service, whether an area served by a data forwarding gateway through which the terminal connects to a packet data network (PDN) is inconsistent with an area served by a first anchor gateway; and detecting whether a current voice bearer of the terminal is released completely;

in response to determining that the area served by the data forwarding gateway is inconsistent with the area served by the first anchor gateway, and in response to detecting that the current voice bearer of the terminal is released completely:

sending, to the terminal, a PDN connection release request that carries a reconnection indication;

receiving a PDN reconnection request sent by the terminal;

selecting a second anchor gateway that serves an area consistent with the area served by the data forwarding gateway; and connecting the terminal to the PDN through the second anchor gateway.

9. The method according to claim 8, wherein determining whether the area served by the data forwarding gateway is inconsistent with the area served by the first anchor gateway comprises comparing a host name of the first anchor gateway and a host name of the data forwarding gateway.

10. The method according to claim 8, wherein determining whether the area served by the data forwarding gateway through which the terminal connects to the PDN is inconsistent with the area served by the first anchor gateway comprises determining, according to a local anchor gateway list, whether the first anchor gateway is in the local anchor gateway list.

11. The method according to claim 8, wherein the PDN connection release request that carries a voice PDN connection release request.

12. The method according to claim 8, wherein the data forwarding gateway is a serving gateway (SGW); and
wherein the first anchor gateway or the second anchor gateway is a PDN gateway (PGW).

13. The method according to claim 8, wherein the change in the position of the terminal is detected when the terminal has roamed from a first public land mobile network (PLMN) to a second PLMN.

14. The method according to claim 8, wherein the data forwarding gateway is a Gn/Gp general PDN packet radio service (GPRS) support node (SGSN); and
wherein the first anchor gateway or the second anchor gateway is a gateway GPRS support node (GGSN).

15. The device according to claim 1, wherein the data forwarding gateway is a Gn/Gp general PDN packet radio service (GPRS) support node (SGSN); and
wherein the first anchor gateway or the second anchor gateway is a gateway GPRS support node (GGSN).

16. The device according to claim 1, wherein the instruction to determine comprises an instruction to detect whether the terminal has roamed from a first public land mobile network (PLMN) to a second PLMN.

* * * * *